United States Patent [19]

Nittoli

[11] Patent Number: 5,461,745
[45] Date of Patent: Oct. 31, 1995

[54] AUTOMATIC VEHICLE WASHING APPARATUS

[75] Inventor: Frank J. Nittoli, Rahway, N.J.

[73] Assignee: Advance Car Wash Equipment, Inc., Rahway, N.J.

[21] Appl. No.: 337,063

[22] Filed: Nov. 10, 1994

Related U.S. Application Data

[63] Continuation-in-part of Ser. No. 276,104, Jul. 15, 1994, Pat. No. 5,410,770.

[51] Int. Cl.⁶ .................................. B60S 3/06; B60S 3/04
[52] U.S. Cl. ...................... 15/97.3; 15/230.16; 15/230.19; 15/DIG. 2; 451/469
[58] Field of Search ....................... 15/97.3, 230, 230.16, 15/230.19, DIG. 2; 451/466, 468, 469

[56] References Cited

U.S. PATENT DOCUMENTS

| | | |
|---|---|---|
| 1,897,971 | 2/1933 | Johnston . |
| 3,403,417 | 10/1968 | Hanna et al. . |
| 3,685,217 | 8/1972 | Belanger . |
| 3,869,833 | 3/1975 | Belanger . |
| 3,940,821 | 3/1976 | Moran . |
| 4,018,014 | 4/1977 | Belanger . |
| 4,096,600 | 6/1978 | Belanger . |
| 4,104,756 | 8/1978 | Gasser et al. . |
| 4,165,778 | 8/1979 | Smith . |
| 4,166,302 | 9/1979 | Kim . |
| 4,166,303 | 9/1979 | Fromme . |
| 4,338,698 | 7/1982 | Beer et al. . |
| 4,377,878 | 3/1983 | Pecora ........................................ 15/97.3 |
| 4,567,619 | 2/1986 | Clark ........................................... 15/97.3 |
| 4,603,447 | 8/1986 | Beer ............................................ 15/97.3 |
| 4,653,135 | 3/1987 | Clark ....................................... 15/230.16 |
| 4,670,929 | 6/1987 | Hanna ......................................... 15/97.3 |
| 4,756,040 | 7/1988 | Sereny ........................................ 15/97.3 |
| 4,967,442 | 11/1990 | Weigele . |
| 5,134,742 | 8/1992 | Ennis . |
| 5,148,570 | 9/1992 | Crotts et al. . |
| 5,167,044 | 12/1992 | Belanger et al. . |
| 5,177,825 | 1/1993 | Belanger et al. . |
| 5,259,084 | 11/1993 | Kaady et al. . |

Primary Examiner—Edward L. Roberts, Jr.
Attorney, Agent, or Firm—Ralph W. Selitto, Jr.

[57] ABSTRACT

A motor vehicle washing apparatus having a brush assembly and curtain assembly for prolonging the life of the brush assembly and the curtain assembly by adjusting the length of elements of each when wear occurs. The brush assembly includes a plurality of brush elements mounted on a rotatable drum by connectors which are removably received in channels on the outer surface of the drum. The connectors engage selected slots of a plurality of slots in the brush elements to allow for selectively and incrementally adjusting the position of a free end of each brush element. In a similar fashion, the curtain assembly has a plurality of curtain elements mounted on a support rod or on an oscillating semicircular drum. The curtain elements each have a plurality of slots therein for accommodating self-orienting removable locking fasteners permitting selective and incremental adjusting of the position of a free end of each curtain element.

18 Claims, 6 Drawing Sheets

FIG. 6
FIG. 7
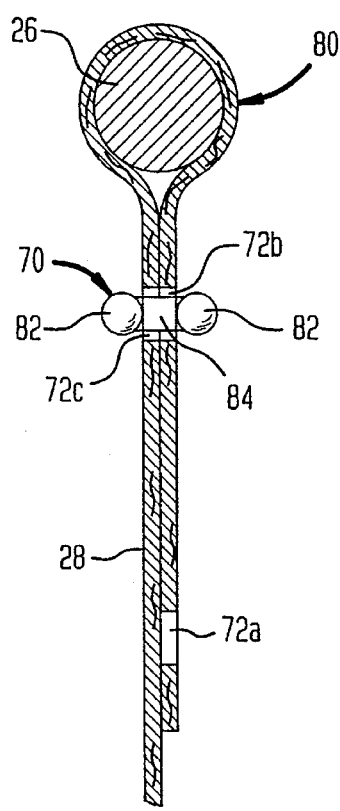
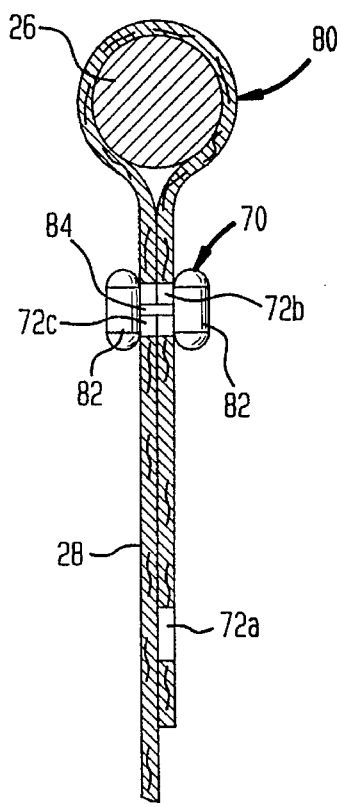
FIG. 8
FIG. 9
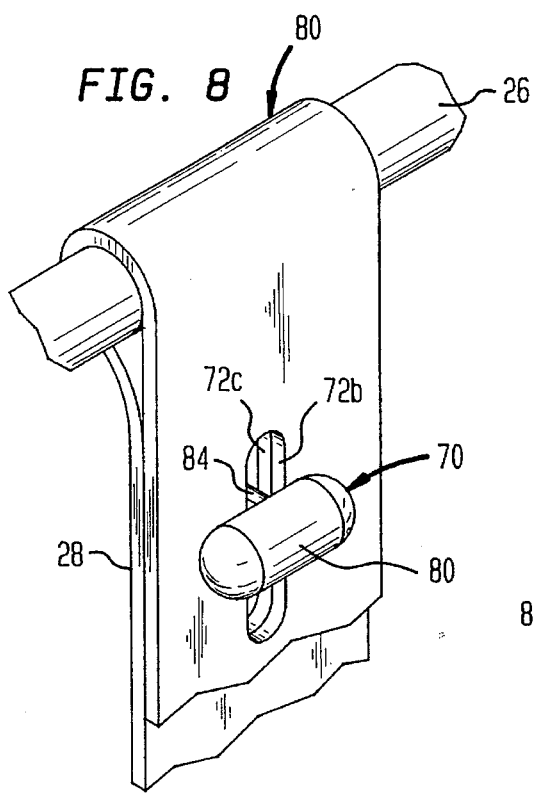
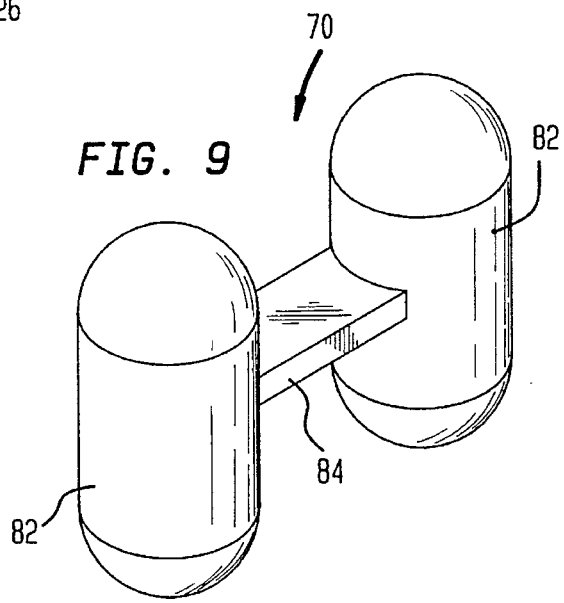

AUTOMATIC VEHICLE WASHING APPARATUS

CROSS REFERENCE TO RELATED APPLICATION

This is a continuation-in-part of application Ser. No. 08/276,104 filed Jul. 15, 1994, now U.S. Pat. No. 5,410,770.

FIELD OF THE INVENTION

The present invention relates to automatic vehicle washing apparatus, and, more particularly, to such apparatus equipped with a rotatable brush assembly and/or a curtain assembly, both of which are adapted to engage a vehicle for cleaning or other associated purposes.

BACKGROUND OF THE INVENTION

Over the years, different mechanized vehicle washing systems have been designed to eliminate the need to scrub vehicles manually with large spongy mittens and the like. Remotely or automatically controlled finishing devices, in the form of brushes, rollers, sponges, cloths, pads, etc., have been used in such mechanized vehicle washing systems to wash, wax, polish or buff the surface of a vehicle. Brush assemblies and curtain assemblies are two types of finishing devices commonly found on modern automatic vehicle washing systems.

A typical brush assembly includes a drum which is mounted for rotation about a substantially vertical axis and which is equipped with a plurality of elongated brush elements, such as bristles or plastic filaments, adapted to contact an exterior surface of a vehicle undergoing a washing or other finishing operation. Since bristles can be harsh on the vehicle surface and might even cause unwanted scratches, it is a popular practice to replace the bristles with flexible felt pads.

In a brush assembly in which the brush elements are made from a plurality of flexible felt pads, the outer circumferential surface of the drum is provided with a series of longitudinally extending slots. Each slot is sized and shaped so as to releasably receive a looped or beaded end of an associated felt pad. The opposite or free end of each pad has a large number of parallel slits projecting inwardly toward the looped or beaded end of the pad to thereby form a plurality of elongated fingers which contact the vehicle surface to perform the desired finishing operation.

In a typical curtain assembly, a number of curtain elements, each of which consists of a length of carpeting, fabric, felt or plastic material, are mounted side-by side from a substantially horizontal support rod. It is common, but necessary, to move the support rod in a reciprocating or oscillating fashion for the purpose of imparting a swinging motion to the curtain elements depending therefrom. Whether they are stationary or swinging, the curtain elements have free ends which contact the vehicle surface to perform the desired finishing operation.

Although the use of finishing elements formed from felt pads, whether used as brush elements or curtain elements, minimizes any undesirable scratching of the vehicle surface, the felt pads themselves are subject to considerable wear due to their repetitive contact with the vehicle surface. In fact, the free or "working" ends of such pads are literally worn off, thereby shortening the overall length of the brush or curtain element to an extent which prevents it from contacting the vehicle. Thus, the entire vehicle washing system must be shut down so that the worn finishing elements can be removed and replaced. In addition to undesired operating downtime, there is the increased cost of replacing the entire brush and/or curtain element. Since this cost is relatively expensive, brush and/or curtain replacement significantly increase the cost of maintaining and operating the vehicle washing system. Because of the increased cost, operators tend to utilize worn pads for excessive periods of time, thus causing a decrease in the efficiency of the vehicle washing system.

In the past, various proposals have been made to eliminate or minimize the wear problem associated with the brush assemblies and the curtain assemblies discussed above. For instance, Clark U.S. Pat. Nos. 4,567,619 and 4,653,135 disclose a brush assembly finishing element formed as a cloth pad which can be adjusted in length to compensate for wear. The adjusting means includes a plurality of loops formed in the cloth pad, each loop being adapted for insertion into a groove on a periphery of a drum. Beer U.S. Pat. No. 4,603,447 relates to a disk-type brush whose diameter may be varied to permit field adjustment for brush wear. Crotts et al. U.S. Pat. No. 5,148,570 discloses an adjustable curtain assembly that uses a roller bar to adjust the length of an entire bank of curtain elements. Curtain elements have also been removably attached to a support rod through the use of Velcro fasteners (see, for instance, Moran U.S. Pat. No. 3,940,821; Kim U.S. Pat. No. 4,166,302; Seveny U.S. Pat. No. 4,756,040; and Weigele U.S. Pat. No. 4,967,442.)

SUMMARY OF THE INVENTION

The present invention relates to an automatic vehicle washing apparatus equipped with a new and improved brush assembly and/or a new and improved curtain assembly. Both assemblies utilize finishing elements (i.e., brush or curtain elements, respectively) which may be adjusted to compensate for wear at their free or "working" ends.

With respect to the new and improved brush assembly, it includes a plurality of elongated brush elements removably mounted on a rotatable drum. Each brush element has a free end positioned remote from the drum that engages a vehicle passing alongside the brush assembly. Each of the brush elements is releasably mounted on the drum by a connector removably received within a channel formed in an outer circumferential surface of the drum such that the brush element itself does not extend into the channel. In order to compensate for wear, the brush elements are selectively and incrementally adjustable such that the position of the free end of each brush element relative to the drum may be adjusted independently of the other brush elements.

With respect to the curtain assembly, in one embodiment, it includes a plurality of elongated curtain elements removably mounted on a support rod in a side-by-side fashion. Each curtain element has a free end which is positioned remote from the support rod and which is engageable with a vehicle passing through the curtain assembly. In order to compensate for wear, the curtain elements are selectively and incrementally adjustable such that the position of the free end of each curtain element relative to the support rod may be adjusted independently of the other curtain elements.

In another embodiment, the curtain assembly includes a semicircular drum having a plurality of grooves in an exterior surface thereof. Each of the grooves is sized and shaped so as to receive a plurality of hangers for hanging curtain elements. Each curtain element has a free end which is positioned remote from the hanger and which is engageable with a vehicle passing through the curtain assembly. In order to compensate for wear, the curtain elements are selectively and incrementally adjustable such that the position of the free end of each curtain element relative to the hanger may be adjusted independently of the other curtain elements.

BRIEF DESCRIPTION OF THE DRAWINGS

For a better understanding of the present invention, reference is made to the following description of various exemplary embodiments of the invention considered in conjunction with the accompanying drawings, in which:

FIG. 6 is a cross-sectional view, taken along section line 6—6 of FIG. 5A and looking in the direction of the arrows, of the curtain assembly illustrated in FIG. 5A;

FIG. 7 is a cross-sectional view similar to FIG. 6, except that the fastener shown in FIG. 6 in its locked position has been moved to its unlocked position in FIG. 7;

FIG. 8 is a perspective view of the curtain element shown in cross-section in FIG. 6;

FIG. 9 is a perspective view of the fastener employed in the curtain assembly illustrated in FIGS. 1, 5A, 5B, 6, 7 and 8.

DETAILED DESCRIPTION OF THE EXEMPLARY EMBODIMENTS

While the present invention has applicability to many different finishing aspects of motor vehicle washing systems, such as washing, waxing, polishing, buffing and drying, it is especially suitable for use in connection with a washing system specifically. Accordingly, the present invention will be described hereinafter in connection with an automatic motor vehicle washing apparatus, it being understood that the present invention may also be used to perform other finishing operations carried out by automatic motor vehicle washing systems.

Figure 1:
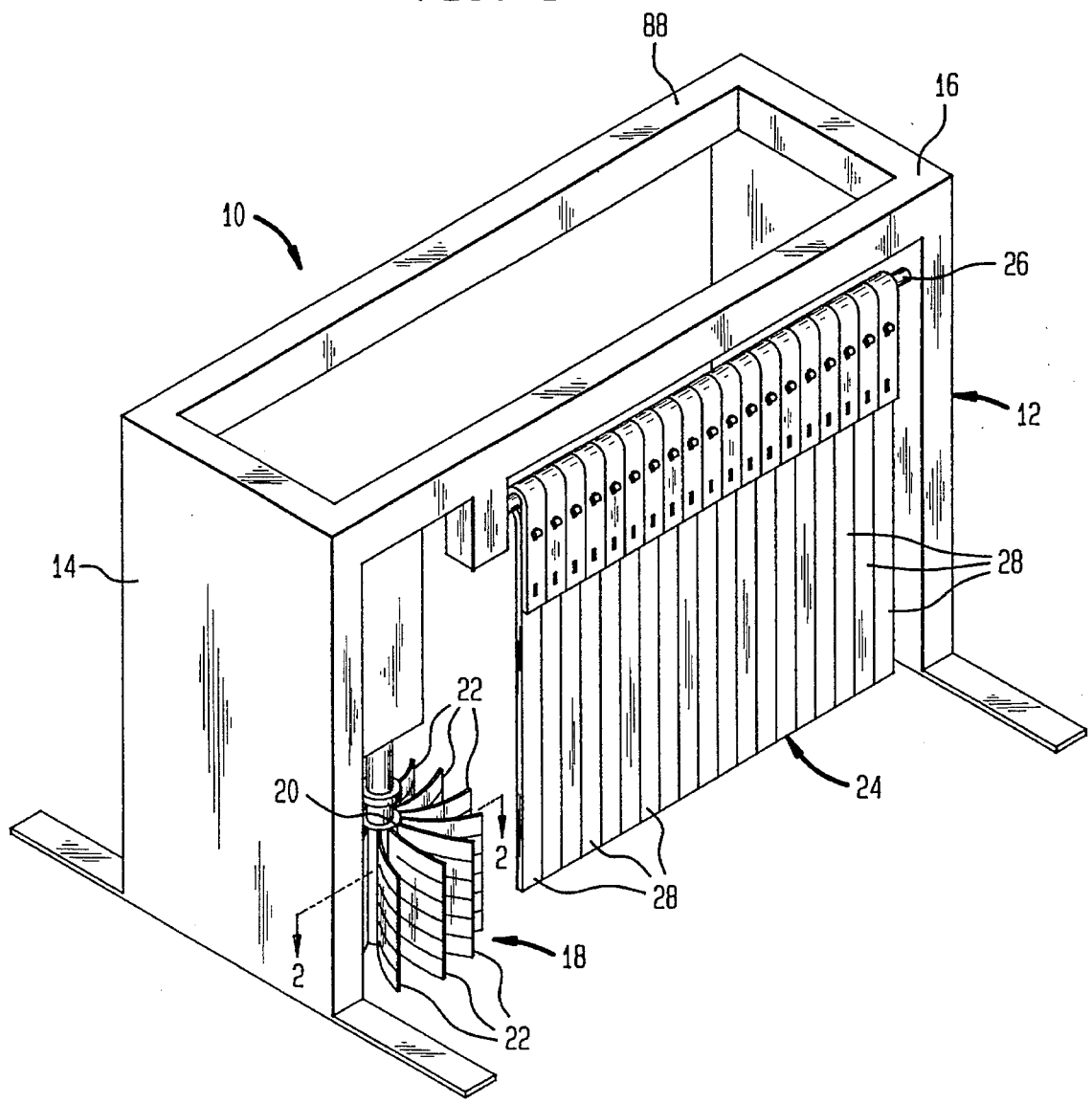
FIG. 1 is a perspective view of an automatic vehicle washing apparatus which is constructed in accordance with the present invention and which employs a new and improved rotatable brush assembly, as well as a new and improved oscillating curtain assembly.
Figure 2A:
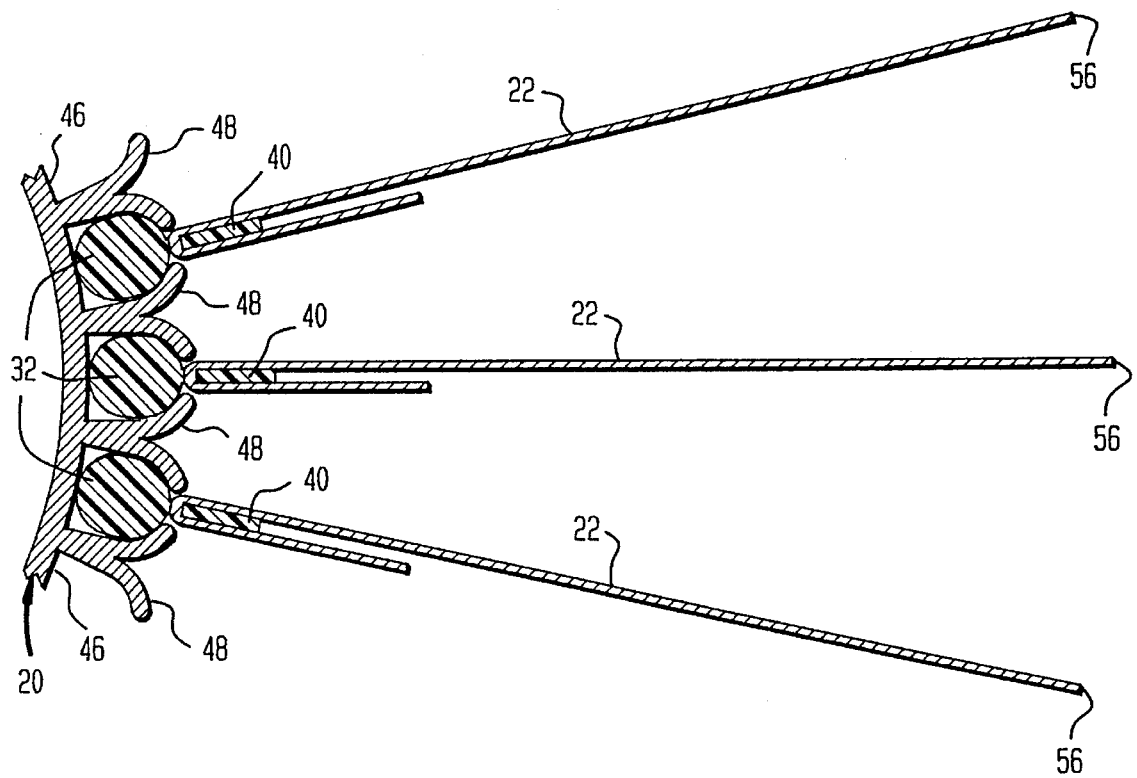
FIG. 2A is a partial cross-sectional view, taken along section line 2—2 of FIG. 1 and looking in the direction of the arrows, of the brush assembly illustrated in FIG. 1, the brush elements of the assembly being shown in their original or non-adjusted positions.
Figure 2B:
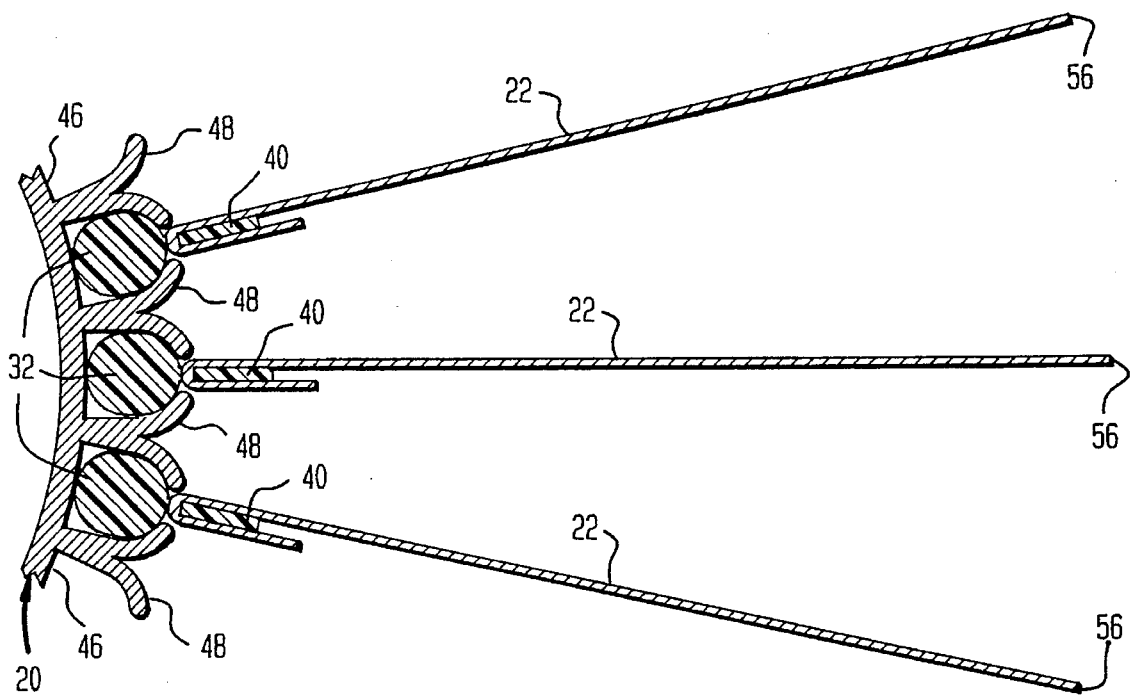
FIG. 2B is a partial cross-sectional view, taken along section line 2—2 of FIG. 1 and looking in the direction of the arrows, of the brush assembly illustrated in FIG. 1, the brush elements of the assembly being shown in their extended or adjusted positions.
Figure 3:
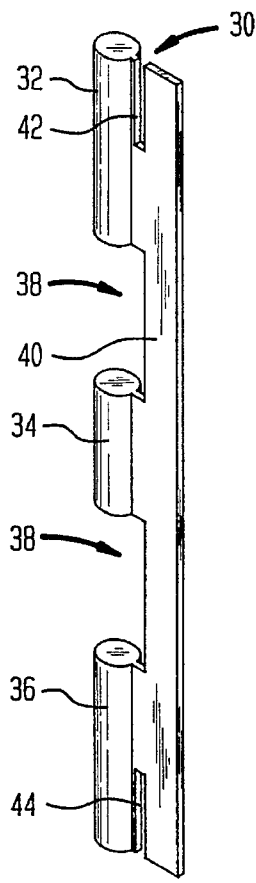
FIG. 3 is a perspective view of a spindle connector employed by the brush assembly shown in FIGS. 2A and 2B.

Referring to FIG. 1, an automatic motor vehicle washing apparatus is illustrated generally at 10. The vehicle washing apparatus 10 includes an inverted U-shaped frame 12 which defines an arch under which a vehicle (not shown) may pass. As it passes under the arch, the vehicle is washed from front to back. The frame 12 includes a vertical side frame member 14 which supports a horizontally disposed roof frame member 16. The frame 12 is a lightweight structural steel component fabricated in a well known manner and connected by conventional welding techniques.

A brush assembly 18 is suspended from the roof frame member 16 for washing lower side surfaces of a vehicle as it passes through the vehicle washing apparatus 10. The brush assembly 18 includes a rotatable drum 20, upon which a number of brush elements 22 are removably and adjustably mounted. Each brush element 22 extends radially outward from the drum 20 and is made out of a conventional brush element material, such as a non-woven needle punch felt.

Immediately in front of, and above, the brush assembly 18 is a curtain assembly 24 which washes the upper surface of a vehicle as it passes through the vehicle washing apparatus 10. The curtain assembly 24 includes a support rod 26 upon which a number of curtain elements 28 are removably and adjustably mounted. Each curtain element 28 is a relatively narrow and long strip of conventional curtain element material, such as a non-woven needle punch felt. The support rod 26 may be moved in a reciprocating or oscillating fashion in order to impart a swinging motion to the curtain elements 28 depending therefrom. However, it is not essential that the support rod 26 oscillate; it may remain in a stationary position relative to the roof frame 16. Each curtain element 28 is deflectable so that a vehicle passing through the washing apparatus 10 will not be obstructed by the curtain elements 28.

Referring now to FIGS. 2A, 2B, 3 and 4, the brush assembly 18 includes the drum 20, a spindle connector 30 (see FIG. 3) and the brush element 22. The spindle connector 30 includes a plurality of protruding portions, namely an upper barrel 32, a middle barrel 34 and a lower barrel 36; a plurality of cut-out portions 38; a blade 40; and grooves 42, 44. The grooves 42, 44 are located between the top of the upper barrel 32 and the blade 40, and the bottom of the lower barrel 36 and the blade 40, respectively. The conventional cylindrical drum 20 has an outer circumferential wall 46 which is provided with a plurality of generally radially extending elongated ribs 48 projecting outwardly therefrom. The ribs 48 define a plurality of elongated channels 50 extending along the length of the drum 20. The channels 50, which are disposed in closely adjacent but parallel relationship around the complete periphery of the drum 20, open outwardly but have a reduced width or throat at the radially outer end thereof.

Figure 4:
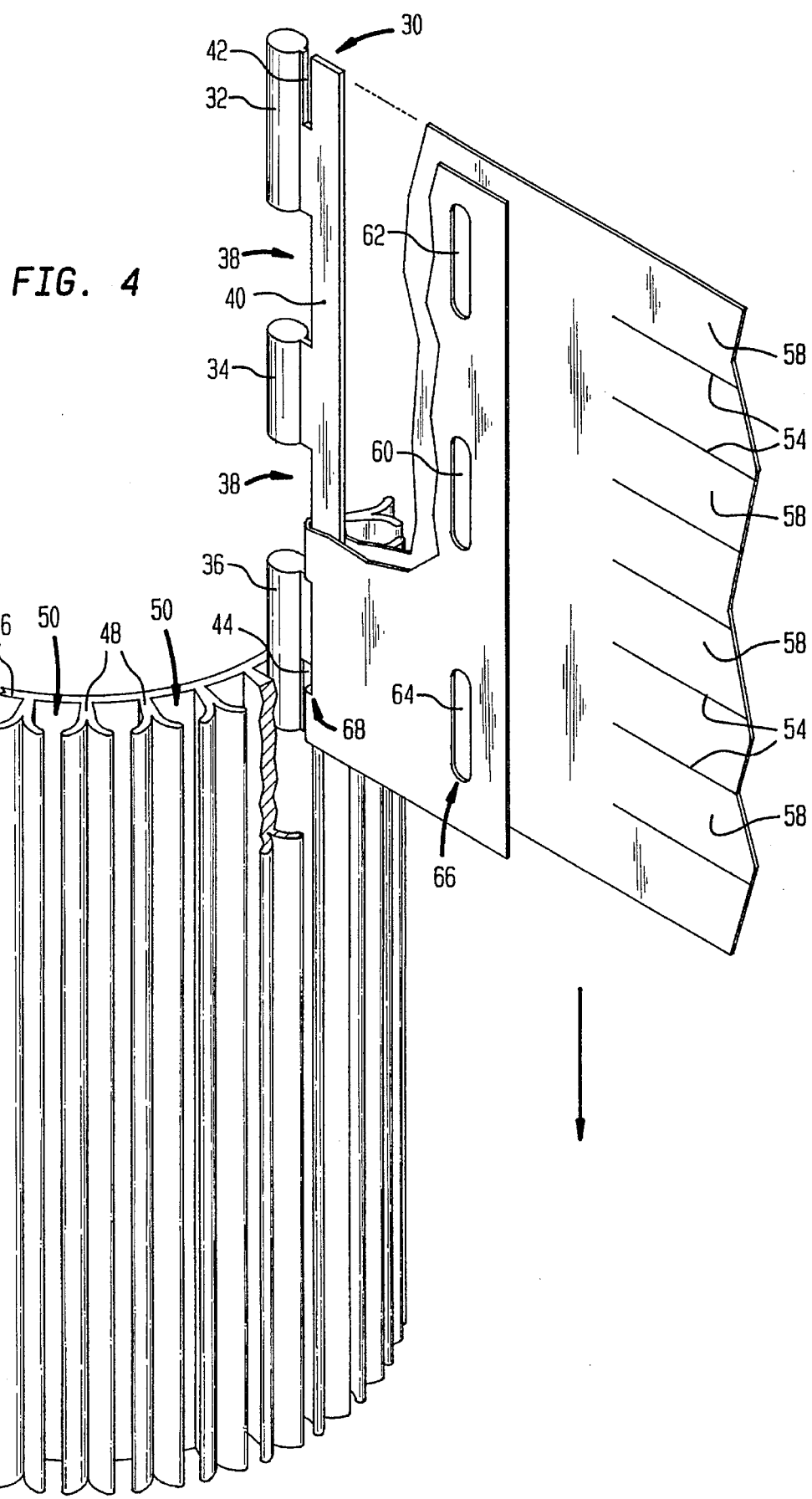
FIG. 4 is an exploded, perspective view of the brush assembly illustrated in FIGS. 2A and 2B, portions of the brush assembly having been omitted or broken away to facilitate consideration and discussion.

With particular reference to FIG. 4, the brush element 22 includes a plurality of slots which will be described in detail hereinafter. A plurality of elongated cuts or slits 54 (see FIG. 4) project inwardly from a free end 56 (see FIGS. 2A and 2B) so as to result in the formation of a plurality of elongated flexible strips (i.e., fingers) 58 (see FIGS. 1 and 4). While the middle barrel 34 is the same size as a corresponding slot 60 in the brush element 22, the upper and lower barrels 32, 36 are longer than corresponding slots 62, 64, respectively. This is so that after threading, which will be described hereinafter, the brush element 22 will remain snugly retained in the grooves 42, 44 between the barrels 32, 36 and the blade 40.

The slots 60, 62, 64 form a first column or series of slots 66 on the brush element 22. Another identical column or series of slots 68 (only one of which is visible in FIG. 4) is provided on the brush element 22 between the column of slots 66 and the free end 56 of the brush element 22.

In initial use, the barrels 32, 34, 36 are threaded through the series of slots 68 as shown in FIG. 4. The sequence for threading is the upper barrel 32, followed by the lower barrel 36 (or vice versa) and then, finally, the middle barrel 34. When the brush element 22 wears at the free end 56 because of repeated contact with vehicle surfaces, the brush element 22 is extended outward by removing the spindle connector 30 from the channel 50 and then rethreading the barrels 32, 34, 36 through the series of slots 66 in the same sequence described above. In the exemplary embodiment, two series of slots are illustrated. However, more than two series of slots could be used and the extending and threading process would be continued until all of the series of slots have been utilized. In this way, the length of the brush element 22 is adjusted to compensate for wear.

Thus, providing the brush element 22 with a plurality of series of slots enables its useful operating life to be significantly prolonged. In the exemplary embodiment, the useful operating life of the brush element 22 is doubled. At the same time, the brush element 22 is of only minimal additional expense to produce, since it requires only an inexpensive procedure to punch or otherwise form the series of slots 66, 68.

Figure 5A:
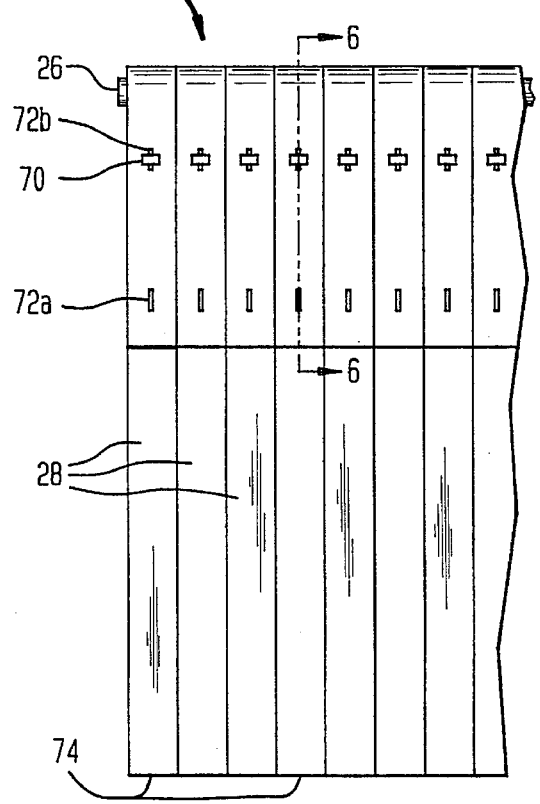
FIG. 5A is a partial elevational view of the curtain assembly illustrated in FIG. 1, the curtain elements of the assembly being shown in their original or non-adjusted positions.
Figure 5B:
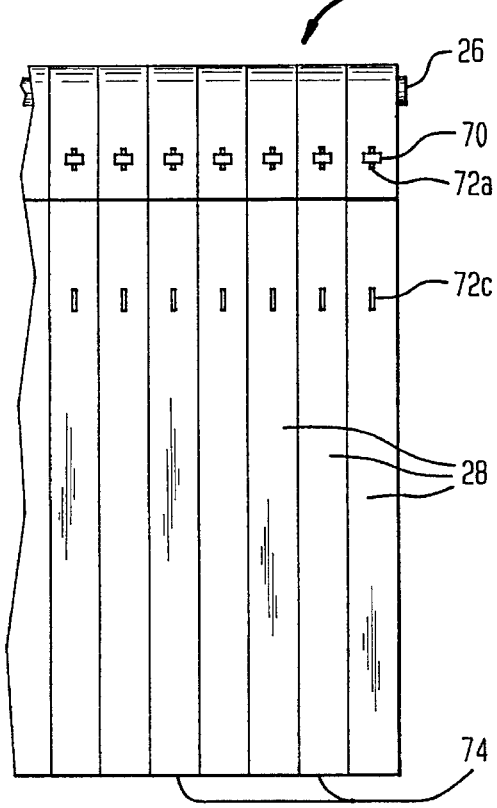
FIG. 5B is a partial elevational view of the curtain assembly illustrated in FIG. 1, the curtain elements of the assembly being shown in their extended or adjusted positions.

Referring now to FIGS. 5A, 5B and 6, the curtain assembly 24 includes a plurality of curtain elements 28 mounted on the support rod 26 with each curtain element 28 being secured on the rod 26 by a fastener 70 which is inserted into slots 72a, 72b and 72c on the curtain element 28. The curtain elements 28 may be single pieces of curtain, as shown, or, alternately, may contain a plurality of curtain elements 28 attached to a common header. In the exemplary embodiment, there are three slots 72a, 72b, and 72c on each curtain element 28. The slots 72a, 72b and 72c are spaced apart in equal increments along an upper length of each curtain element 28 and are longitudinally elongated.

As shown in FIG. 6, when each curtain element 28 is first placed in use, the curtain element 28 is wrapped around the support rod 26 forming a loop 80 so that slots 72a and 72b are positioned on one side of the support rod 26 and slot 72c is positioned on the other side. Slots 72b and 72c are then aligned so that the fastener 70 may be inserted through the slots. As shown in FIG. 5B, when a free end 74 of the curtain element 28 wears because of repeated contact with vehicle surfaces, the fastener 70 is removed and the worn curtain element 28 is adjusted so that slot 72a is positioned on one side of the support rod 26 and slots 72b and 72c are positioned on the other side, thereby aligning slot 72a with slot 72b. The fastener 70 is then inserted through slots 72a and 72b. In the exemplary embodiment, there are three slots in each element 28. A greater number of slots may be employed to accomplish the compensation for wear.

Thus, providing the curtain element 28 with a plurality of slots enables its useful operating life to be significantly prolonged. In the exemplary embodiment, the useful operating life is doubled. At the same time, the curtain element 28 is of only minimal additional expense, since it requires only an inexpensive procedure to punch or otherwise form the slots 72a, 72b, 72c.

FIGS. 7, 8, and 9 show the fastener 70 having a pair of locking posts 82 connected by a crossbar 84. The fastener 70 is generally H-shaped with the locking posts 82 being substantially cylindrical. The crossbar 84 is substantially planar and wider in the direction perpendicular to the line connecting the locking posts 82, thereby causing the fastener 70 to maintain the orientation shown in FIG. 8 when installed in the slot 72 and facilitating its removal by expanding the slot 72b when the fastener 70 is moved to its unlocked position (see FIG. 7). When the fastener 70 is inserted into the slot 72b, the greatest dimension of each locking post 82 is oriented parallel to the slot 72b in order to pass the fastener 70 through the slot 72b. FIGS. 7 and 9 show the fastener 70 in its unlocked (i.e., insert/remove) position. In order to secure and lock the fastener 70 in the slot 72b, the fastener 70 is turned 90° so that each locking post 82 is perpendicular to the slot 72b and the crossbar 84 is parallel to the slot 72b. FIGS. 6 and 8 show the fastener 70 in its locked position.

Figure 10:
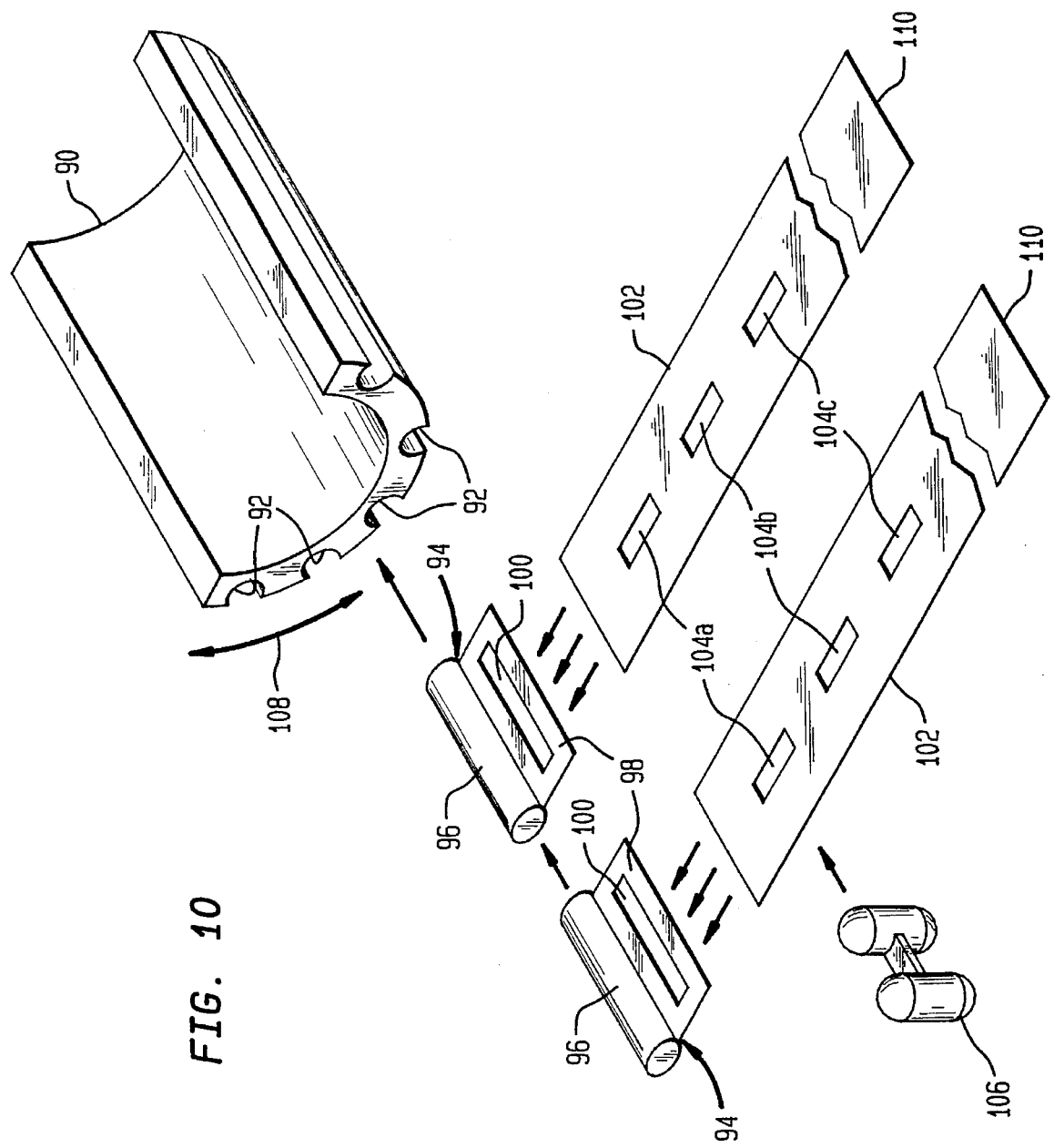
FIG. 10 is an exploded perspective view of an alternate embodiment of the curtain assembly illustrated in FIGS. 1, 5A, 5B, 6, 7 and 8.

With reference to FIG. 10, there is shown a curtain assembly 86 that can be used as a substitute for the curtain assembly 24 or in combination with the curtain assembly 24. When used in combination with the curtain assembly 24, the curtain assembly 86 could, for instance, be mounted from a roof frame member 88 of the frame 12 (see FIG. 1).

Referring still to FIG. 10, the curtain assembly 86 includes a semicircular drum 90 having a plurality of grooves 92 in an exterior surface thereof. Each of the grooves 92 is sized and shaped so as to receive a plurality of hangers 94 (only two of which are shown in FIG. 10). Each of the hangers 94 is provided with a barrel 96 and a web 98 extending outwardly therefrom. The web 98 has a centrally located aperture 100 sized and shaped so as to receive a curtain element 102, which is essentially the same as the curtain element 28. Thus, the curtain element 102 includes a plurality of slots 104a, 104b and 104c adapted to receive a fastener 106, which is essentially the same, in both design and operation, as the fastener 70 of FIGS. 7, 8, and 9. The semicircular drum 90 is adapted for reciprocating or oscillating movement as indicated by arrow 108 so that each curtain element 102 swings across an upper portion of a vehicle which is passing through the apparatus 10 (see FIG. 1).

When each curtain element 102 is first placed in use, the curtain element 102 is looped through the aperture 100 in a corresponding one of the hangers 94 until the slots 104a and 104b are positioned on one side of the web 98 and the slot 104c is positioned on the other side of the web 98. The slots 104b and 104c are then aligned so that the fastener 106 may be inserted through them, thereby securing the curtain element 102 to the hanger 94. When a free end 110 of the curtain element 102 wears because of repeated contact with vehicle surfaces, the fastener 106 is removed and the worn curtain element 102 is adjusted so that slot 104a is positioned on one side of the web 98 and the slots 104b and 104c are positioned on the other side, thereby aligning the slot 104a with the slot 104b. The fastener 106 is then inserted through the aligned slots 102a and 102b. In the exemplary embodiment, there are three slots in each curtain element 102. However, a greater number of slots may be employed to accomplish the compensation for wear.

While the present invention has been described as relating to a brush assembly for washing the lower side parts of a vehicle and a curtain assembly for washing the upper parts of a vehicle as a vehicle passes through the vehicle washing system, the assemblies described are not limited to washing the specific portions of the vehicle described in connection with the foregoing exemplary embodiments. Moreover, while the drawings and description contained herein necessarily depict and describe exemplary embodiments of an apparatus useful in practicing the present invention, it should be appreciated that the present invention can be practiced in various other forms and configurations. Further, the foregoing detailed description of the exemplary embodiments of the present invention has been presented for purposes of clarity of understanding only; and, therefore, no unnecessary limitations should be understood or implied therefrom. Finally, any and all appropriate mechanical and functional equivalents to the various elements described hereinabove are considered to be encompassed within the scope of the following claims.

I claim:

1. A curtain assembly for a vehicle washing apparatus, comprising a plurality of elongated curtain elements, each curtain element having a free end engageable with a vehicle passing through said curtain assembly; and mounting means for removably mounting said curtain elements on an oscillating drum such that said curtain elements are arranged in rows with said free ends thereof remote from said oscillating drum, each row having at least a pair of side-by-side curtain elements, said mounting means including adjusting means for selectively and incrementally adjusting the position of said free ends of said curtain elements relative to said oscillating drum, whereby the position of each individual curtain element relative to said oscillating drum can be adjusted independently of the other curtain elements to compensate for wear at its free end.

2. A curtain assembly according to claim 1, wherein said mounting means includes a plurality of hangers and a plurality of grooves in said oscillating drum, each of said grooves being sized and shaped so as to receive a row of said hangers.

3. A curtain assembly according to claim 2, wherein each of said hangers includes a barrel, a web extending outwardly from said barrel, and an aperture extending through said web.

4. A curtain assembly according to claim 3, wherein said mounting means further includes a loop formed in each of said curtain elements.

5. A curtain assembly according to claim 4, wherein each of said loops passes through said aperture of a corresponding one of said hangers.

6. A curtain assembly according to claim 5, wherein each of said grooves is located on an exterior surface of said oscillating drum.

7. A curtain assembly according to claim 6, wherein said oscillating drum has a semicircular shape.

8. A curtain assembly according to claim 6, wherein said adjusting means includes a series of slots formed in each of said curtain elements, each slot of a corresponding series of slots being alignable with another slot of said series upon the formation of said loop, and a plurality of fasteners, each fastener extending through an aligned pair of slots in a corresponding one of said curtain elements and being manually movable between a locked position, in which said fastener maintains said loop, and an unlocked position, in which said fastener releases said loop.

9. A curtain assembly according to claim 8, wherein the slots of each series of slots are spaced apart in equal increments along a longitudinal axis of a corresponding one of said curtain elements.

10. A curtain assembly according to claim 9, wherein the slots of each series of slots are elongated and are arranged parallel to said longitudinal axis of their corresponding curtain element.

11. A curtain assembly according to claim 10, wherein each series of slots includes three slots, whereby said curtain elements are adjustable between at least two positions.

12. A curtain assembly according to claim 10, wherein each fastener is H-shaped and includes a pair of locking posts and a crossbar extending between said locking posts.

13. A curtain assembly according to claim 12, wherein said crossbar is substantially planar, said crossbar being arranged generally parallel to a corresponding pair of aligned slots when said fastener is in its locked position and being arranged generally perpendicular to said corresponding pair of aligned slots when said fastener is in its unlocked position.

14. A curtain assembly according to claim 13, wherein said locking posts are substantially cylindrical, said locking posts being arranged generally perpendicular to a corresponding pair of aligned slots when said fastener is in its locked position and being arranged generally parallel to said pair of aligned slots when said fastener is in its unlocked position.

15. A curtain assembly according to claim 14, wherein said crossbar, when arranged generally perpendicular to said corresponding pair of slots, is wider than said slots, whereby said crossbar expands said slots so that said locking posts can more readily pass therethrough.

16. A curtain assembly according to claim 1, wherein said curtain elements are made from a felt material.

17. A motor vehicle washing apparatus, comprising a curtain assembly including a plurality of elongated curtain elements, each curtain element having a free end engageable with a vehicle passing through said curtain assembly, and first mounting means for removably mounting said curtain elements on an oscillating drum such that said curtain elements are arranged in rows with said free ends thereof remote from said oscillating drum, each row having at least a pair of side-by-side curtain elements, said first mounting means including adjusting means for selectively and incrementally adjusting the position of said free ends of said curtain elements relative to said oscillating drum, whereby the position of each individual curtain element relative to said oscillating drum can be adjusted independently of the other curtain elements to compensate for wear at its free end; and a brush assembly including a plurality of elongated brush elements, each brush element having a free end engageable with a vehicle passing alongside said brush assembly, and second mounting means for removably mounting said brush elements on a rotatable drum such that said brush elements extend radially outwardly from said drum and such that said free ends of said brush elements are positioned remote from said drum, said second mounting means including connecting means, removably received within channels formed in an outer circumferential surface of said drum, for releasably connecting said brush elements to said drum such that each of said brush elements is positioned externally of a corresponding one of said channels, whereby said brush elements are mounted from said drum without extending into said channels thereof, and second adjusting means for selectively and incrementally adjusting the position of said free ends of said brush elements relative to said drum, whereby the position of each individual brush element relative to said drum can be adjusted independently of the other brush elements to compensate for wear at its free end.

18. A motor vehicle washing apparatus, comprising a first curtain assembly including a first set of elongated curtain elements, each curtain element of said first set of curtain elements having a free end engageable with a vehicle passing through said first curtain assembly, and first mounting means for removably mounting said curtain elements of said first set of curtain elements on a support rod such that said curtain elements of said first set of curtain elements depend from said support rod in a side-by-side fashion and such that said free ends of said curtain elements of said first set of curtain elements are positioned remote from said support rod, said first mounting means including first adjusting means for selectively and incrementally adjusting the position of said free ends of said curtain elements of said first set of curtain elements relative to said support rod, whereby the position of each individual curtain element of said first set of curtain elements relative to said support rod can be adjusted independently of the other curtain elements of said first set of curtain elements to compensate for wear at its free end; a brush assembly including a plurality of elongated brush elements, each brush element having a free end engageable with a vehicle passing alongside said brush assembly, and second mounting means for removably mounting said brush elements on a rotatable drum such that said brush elements extend radially outwardly from said drum and such that said free ends of said brush elements are positioned remote from said drum, said second mounting means including connecting means, removably received within channels formed in an outer circumferential surface of said drum, for releasably connecting said brush elements to said drum such that each of said brush elements is positioned externally of a corresponding one of said channels, whereby said brush elements are mounted from said drum without extending into said channels thereof, and second adjusting means for selectively and incrementally adjusting the position of said free ends of said brush elements relative to said drum, whereby the position of each individual brush element relative to said drum can be adjusted independently of the other brush elements to compensate for wear at its free end; and a second curtain assembly including a second set of elongated curtain elements, each curtain element of said second set of curtain elements having a free end engageable with a vehicle passing through said second curtain assembly, and third mounting means for removably mounting said curtain elements of said second set of curtain elements on an oscillating drum such that said curtain elements of said second set of curtain elements are arranged in rows with said free ends thereof remote from said oscillating drum, each row having at least a pair of side-by-side curtain elements of said second set of curtain elements, said third mounting means including third adjusting means for selectively and incrementally adjusting the position of said free ends of said curtain elements of said second set of curtain elements relative to said oscillating drum, whereby the position of each individual curtain element of said second set of curtain elements relative to said oscillating drum can be adjusted independently of the other curtain elements of said second set of curtain elements to compensate for wear at its free end.

* * * * *